US011714586B2

(12) United States Patent
Yamada (10) Patent No.: US 11,714,586 B2
(45) Date of Patent: Aug. 1, 2023

(54) NON-TRANSITORY COMPUTER-READABLE STORAGE MEDIUM AND PRINTING SYSTEM

(71) Applicant: BROTHER KOGYO KABUSHIKI KAISHA, Nagoya (JP)

(72) Inventor: Jun Yamada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/705,333

(22) Filed: Mar. 27, 2022

(65) Prior Publication Data
US 2022/0317955 A1    Oct. 6, 2022

(30) Foreign Application Priority Data

Mar. 31, 2021    (JP) .................................. 2021-059359

(51) Int. Cl.
*G06F 3/12*    (2006.01)
(52) U.S. Cl.
CPC ............ *G06F 3/1254* (2013.01); *G06F 3/121* (2013.01); *G06F 3/1204* (2013.01); *G06F 3/1207* (2013.01); *G06F 3/1273* (2013.01)
(58) Field of Classification Search
CPC .... G06F 3/1254; G06F 3/1204; G06F 3/1207; G06F 3/121; G06F 3/1273
See application file for complete search history.

(56) References Cited

U.S. PATENT DOCUMENTS

2007/0225962 A1*  9/2007  Brunet ................ G06F 11/1461
                                                   703/23

FOREIGN PATENT DOCUMENTS

JP         2018-51875 A      4/2018

OTHER PUBLICATIONS

English Machine Translation of JP 2018-051875-A (Watanabe, Published Apr. 5, 2018) (Year: 2018).*

* cited by examiner

*Primary Examiner* — Juan M Guillermety
(74) *Attorney, Agent, or Firm* — Kenealy Vaidya LLP (57)    ABSTRACT

A storage medium storing an application program executable by a computer of an information processing device, an operating system of the information processing device having an automatic function by which, when procedure data indicating: (i) a series of procedures of a plurality of functions and operations; and (ii) an activation condition, is registered therein, the operating system automatically executes the series of procedures in response to the activation condition being satisfied, wherein, when the application program is activated based on the automatic function, the application program causes the computer to: acquire input information which includes activation information for identifying the activation condition; decide print target data based on the acquired activation information acquired; and automatically output a print job based on the decided print target data, the operating system being configured to transmit the input information to the application program at the time of activating the application program.

10 Claims, 9 Drawing Sheets

| PROCEDURE DATA | TRIGGER | ACTION | (INPUT INFORMATION) |
|---|---|---|---|
| SMALL PROCEDURE DATA | RECEPTION OF SMALL REMAINING AMOUNT SIGNAL | ACTIVATION OF PRINTING APPLICATION | (INFORMATION OF SMALL REMAINING AMOUNT SIGNAL) |
| REPLACEMENT PROCEDURE DATA | RECEPTION OF REPLACEMENT COMPLETION SIGNAL | ACTIVATION OF PRINTING APPLICATION | (INFORMATION OF REPLACEMENT COMPLETION SIGNAL) |
| SCHEDULE PROCEDURE DATA | NOTIFICATION FROM SCHEDULE APPLICATION | ACTIVATION OF PRINTING APPLICATION | (INFORMATION OF SCHEDULE) |
| VOICE PROCEDURE DATA | VOICE INPUT OF PREDETERMINED PHRASE | ACTIVATION OF PRINTING APPLICATION | (INFORMATION OF PHRASE) |

NON-TRANSITORY COMPUTER-READABLE STORAGE MEDIUM AND PRINTING SYSTEM

CROSS-REFERENCE TO RELATED APPLICATIONS

This application is based upon and claims the benefit of priority from prior Japanese patent application No. 2021-059359, filed on Mar. 31, 2021, the entire contents of which are incorporated herein by reference.

TECHNICAL FIELD

The technical field disclosed in the present specification relates to a non-transitory computer-readable storage medium storing an application program and a printing system configured to output a print job to a printer.

BACKGROUND

In related art, known is a technology of setting an activation condition of an application program and activating the application program when the activation condition is satisfied. For example, related are discloses a complex machine having incorporated therein a management program configured to manage activation of an application program, where an activation condition is set for each application program by the management program and an application program is activated in a case where there is an application program satisfying the activation condition.

In recent years, an Operating System (OS) is equipped with an automatic function where procedure data indicating a series of procedures of a plurality of functions and operations is registered in the OS and the OS automatically executes the functions and operations according to the registered procedure data. By using the automatic function, it is possible to automate a user's work until a desired output is obtained. Therefore, it is possible to considerably reduce an operation burden of the user, without using the management program disclosed in the related art. However, in a case of an application program configured to output a print job, for example, after activating the application program, it is necessary to perform operations of selecting a print target and inputting a printing instruction. Therefore, there is room for improvement so as to further reduce the operation burden of the user.

SUMMARY

The present specification discloses a technology of reducing a user's labor in operation when causing a printer to print an image in an information processing device where an OS is equipped with an automatic function.

According to an aspect, there is disclosed a non-transitory computer readable storage medium storing an application program executable by a computer of an information processing device, an operating system of the information processing device having an automatic function, and the automatic function being a function that, in a case where procedure data indicating: (i) a series of procedures of a plurality of functions and operations; and (ii) an activation condition for activating the series of procedures, is registered in the operating system, the operating system automatically executes the series of procedures in response to the activation condition being satisfied, wherein the application program is configured to be activated based on a user's operation using a user interface of the information processing device and to be activated based on the automatic function of the operating system, wherein, in a case where the application program is activated based on the user's operation using the user interface of the information processing device, the application program causes the computer to: accept selection of print target data by using the user interface and output a print job based on the selected print target data, wherein, in a case where the application program is activated based on the automatic function of the operating system, the application program causes the computer to: acquire input information which is input from the operating system at the time of activation and includes activation information for identifying the activation condition; decide print target data based on the acquired activation information acquired; and automatically output a print job based on the decided print target data, and wherein the operating system is configured to transmit the input information to the application program at the time of activating the application program based on the automatic function.

The application program disclosed in the present specification may be activated based on the automatic function of the OS when the activation condition included in the registered procedure data is satisfied, and in this case, the application program receives the input information including the activation information, from the OS. In the case where the application program is activated based on the automatic function, the application program further decides the print target data based on the activation information, and automatically outputs a print job for instructing printing based on the print target data. As a result, the print target data is automatically decided and printed. Therefore, as compared to a case where an operation for deciding print target data and an operation for instructing printing are performed after manually activating the application program, it is possible to reduce a user's labor upon printing.

An electronic device configured to implement the function of the application program and a control method for implementing the function of the application program are also novel and useful.

According to the technology disclosed in the present specification, it is possible to implement the technology of reducing a user's labor in operation when causing the printer to print an image in the information processing device where the OS is equipped with the automatic function.

DETAILED DESCRIPTION

Hereinafter, an embodiment where a program incorporated in an electronic device is embodied will be described in detail with reference to the accompanying drawings. The present embodiment discloses an application program (hereinafter, referred to as 'application') incorporated in a portable electronic device such as a smart phone and a tablet computer.

Figure 1:
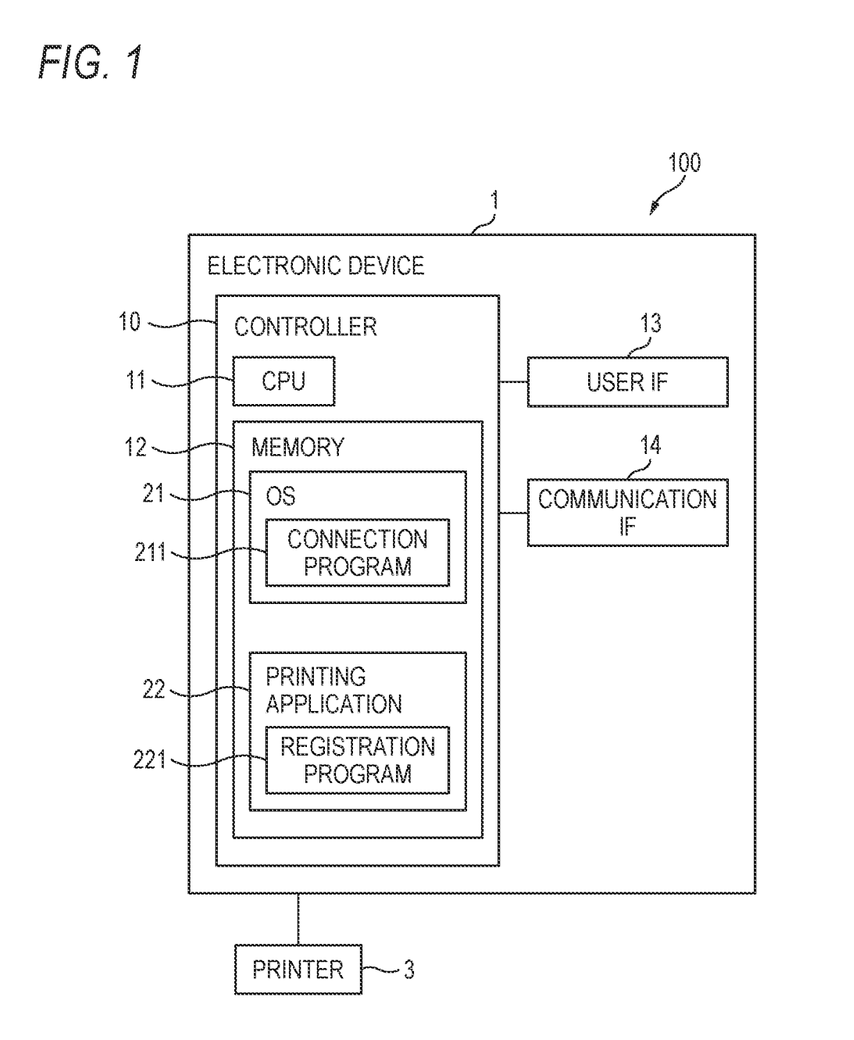
FIG. 1 is a schematic configuration view of an electronic device according to an embodiment.

As shown in FIG. 1, an electronic device 1 of the present embodiment includes a controller 10 including a CPU 11 and a memory 12. In addition, the electronic device 1 includes a user interface (hereinafter, referred to as 'user IF') 13 and a communication interface (hereinafter, referred to as 'communication IF') 14, which are electrically connected to the controller 10. The electronic device 1 is an example of the information processing device. Note that, the controller 10 in FIG. 1 is a general term, which collectively refers to hardware and software used for control of the electronic device 1, and does not necessarily represent single hardware that actually exists in the electronic device 1.

The CPU 11 is configured to execute a variety of processing, according to a program read out from the memory 12 and based on a user's operation. The CPU 11 is an example of the computer. The memory 12 includes, for example, a ROM, a RAM, an HDD and a flash memory, and is configured to store a variety of programs and data.

The user IF 13 includes a configuration having a display function and a configuration having an operation accepting function. The user IF 13 includes, for example, a touch panel having a display function and a touch accepting function, a microphone having a voice input function, and a speaker having a voice output function.

The communication IF 14 includes hardware for performing communication with a variety of external apparatuses. A communication method of the communication IF 14 is Wi-Fi (registered trademark), Bluetooth (registered trademark), USB, NFC (abbreviation of Near Field Communication), or the like. In addition, the electronic device 1 can also be compatible with a plurality of communication methods, as the communication IF 14. The electronic device 1 of the present embodiment can connect to the Internet via the communication IF 14.

The electronic device 1 may further include a camera having a capturing function, and a variety of detection units configured to detect a variety of states of the electronic device 1. The electronic device 1 may include, as the detection units, a position detection unit configured to detect a position of the electronic device 1 in a ground surface direction by a GPS or the like, a posture detection unit configured to detect an inclination of the electronic device 1 with respect to a gravity direction by a gyro or the like, a light amount detection unit configured to detect brightness around the electronic device 1 by an illuminance sensor or the like, etc., for example.

As shown in FIG. 1, in the memory 12 of the electronic device 1 of the present embodiment, an operating system (hereinafter, referred to as 'OS') 21 and a variety of applications are incorporated. The OS 21 is a multi-task OS capable of processing a plurality of tasks in parallel by managing and switching the plurality of tasks, and is any one of iOS (registered trademark), Android (registered trademark), Windows (registered trademark), macOS (registered trademark) and Linux (registered trademark).

In the OS 21 of the electronic device 1 of the present embodiment, a connection program 211 is incorporated. The connection program 211 is a program configured to automatically execute processing registered in procedure data, based on the procedure data registered in advance. The connection program 211 is an example of the program for implementing an automatic function. The connection program 211 is, for example, SiriShortcut that can operate on iOS.

In the connection program 211, one or more procedure data can be registered, and in each procedure data, a trigger that is a condition for starting execution of a procedure, and an action that is a content of the procedure to be executed are associated with each other. The connection program 211 is configured to always perform detection of a trigger of the registered procedure data, and when a trigger is detected, the connection program starts execution of an action stored in association with the trigger, Note that, for the action of the procedure data, a series of procedures for sequentially executing a plurality of functions and operations in a predetermined order can be registered. The trigger is an example of the activation condition of the automatic function, and the action is an example of the procedure of the automatic function.

In each procedure data of the connection program 211, as the trigger, for example, acceptance of a predetermined operation on the user IF 13, detection of predetermined information by a variety of detection units provided to the electronic device 1, and output of predetermined information by a variety of applications incorporated in the electronic device can be registered. In addition, in each procedure data of the connection program 211, as the action, for example, acceptance of an output and an operation input to the user IF 13, activation and stop of a predetermined application, and output of predetermined information to a predetermined application can be registered.

Note that, the electronic device 1 of the present embodiment has a lock function of switching between a lock state and an unlock state, as a display mode of the user IF 13. For example, when an operation is not continuously accepted for a predetermined time or longer, the electronic device 1 is set to the lock state to display a predetermined screen for the lock state and to restrict some of operations on the user IF 13, for example.

In the lock state, the electronic device 1 is configured to accept an input of release information for releasing the lock state, and releases the lock state to be in the unlock state when the information of the accepted input coincides with release information stored in the memory 12. When the electronic device 1 becomes in the unlock state, the electronic device does not display the screen for a lock state, and displays a screen for an unlock state, which is a screen capable of accepting a variety of operations.

However, even in the lock state, the OS 21 and the connection program 211 are configured to perform detection by each detection unit and to determine whether to correspond to the trigger of the registered procedure data. When it is determined that the trigger of the registered procedure data is detected, the connection program 211 automatically starts execution of an action corresponding to the detected trigger, even in the lock state.

In the electronic device 1, a variety of applications can be incorporated. In the electronic device 1 of the present embodiment, a variety of applications including at least a printing application 22 are incorporated. The printing application 22 is a program having functions of generating a print job for causing a printer to execute printing, and transmitting the generated print job to a designated transmission destination. The printing application 22 is an example of the application program.

The printing application 22 of the present embodiment includes a registration program 221 corresponding to the printing application 22. The registration program 221 of the present embodiment is a program having one or more procedure data, which includes an activation procedure of the printing application 22 in an action, and configured to register selected procedure data in the connection program 211 based on a user's operation. Details of operations by the respective programs will be described later.

Note that, the printing application 22 may be a dedicated program corresponding to a predetermined model of a printer or a general-purpose program corresponding to various printers. The printing application 22 may be a program for a printer configured to perform printing on a sheet of a standard size such as A4, a program for a printer configured to perform printing on a label sheet for generation of a label, or a program that can perform both of the above.

As shown in FIG. 1, the electronic device 1 of the present embodiment can connect to a printer 3 corresponding to the printing application 22 via the communication IF 14, and the electronic device 1 including the printing application 22 and the printer 3 constitute a printing system 100. The printer 3 is an apparatus capable of receiving a print job transmitted from the printing application 22 and executing printing based on the received print job.

The printer 3 is, for example, a plain sheet printer capable of executing printing on a sheet such as plain sheet by an electrophotographic method or an inkjet method. The printer 3 of the present embodiment is configured to detect a remaining amount of a coloring material, such as toner or ink, accommodated therein, and can output a small remaining amount signal which includes information indicative of a small remaining amount in a case where it is determined that the detected remaining amount is smaller than a predetermined amount. In addition, the printer 3 can output a replacement completion signal, which includes information indicative of replacement completion, in a case where it is determined that a cartridge accommodating the coloring material has been replaced, in a case where the printer 3 is a printer capable of accommodating a plurality of colors of coloring materials, the small remaining amount signal includes information of a color of a coloring material whose remaining amount is small, and the replacement completion signal includes information of a color of a coloring material accommodated in the replaced cartridge. In a case where the printer 3 is a printer configured to use only a coloring material of one color, the information of a color may not be included in the small remaining amount signal and the replacement completion signal.

The printer 3 further has a function of acquiring a variety of information by communication with an IC tag attached to an accommodated coloring material cartridge, or the like. The printer 3 has, for example, a function of detecting whether a mounted cartridge is a manufacturer genuine product and returning a detection result, based on an instruction from the printing application 22.

Subsequently, examples of various operations by the printing application 22 and the registration program 221 are described with reference to sequence diagrams and the like. Note that, the following processing and each processing step basically show processing of the CPU 11 according to commands described in each program. The processing by the CPU 11 also includes hardware control using an API of the OS 21 of the electronic device 1. In the present specification, operations of the program are described, omitting the description of the OS 21.

Figure 2:
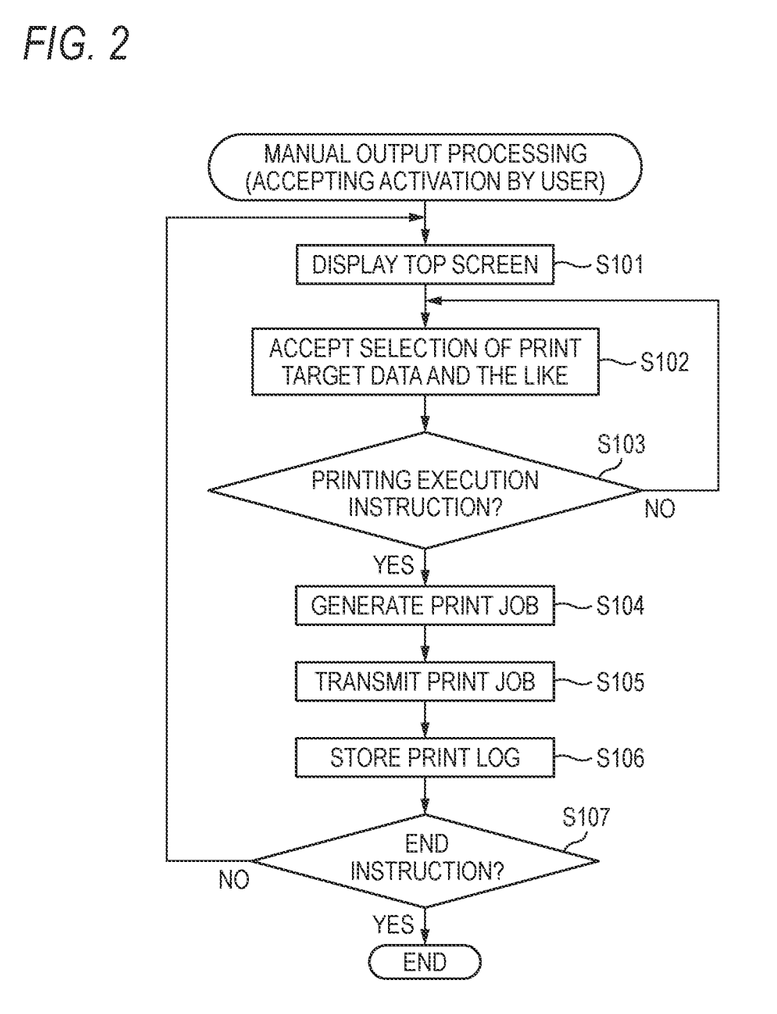
FIG. 2 is a flowchart showing a procedure of manual output processing.

First, a procedure of manual output processing, which is processing of the printing application 22 when manually activated based on a user's operation, is described with reference to a flowchart of FIG. 2. The manual output processing is executed by the CPU 11 of the electronic device 1 on the basis of the printing application 22 when the printing application 22 is designated and activated based on a user's operation on the user IF 13, for example, as a result of an icon of an application being operated by a user.

In the manual output processing, the CPU 11 displays a top screen provided in advance (S101) and accepts a user's operation. The CPU 11 accepts selection of print target data and a print parameter (S102). In a case where a printer is not selected, the CPU 11 also accepts selection of a printer. Then, the CPU 11 determines whether an instruction to execute printing is accepted (S103), and further accepts a user's operation in a case where the instruction is not accepted (S103: NO).

In a case where it is determined that the instruction to execute printing is accepted (S103: YES), the CPU 11 generates a print job (S104), and transmits the generated print job to a designated transmission destination (S105). The transmission destination of the print job may be the printer 3 connected to the electronic device 1 or may be a server shared with a printer not connected to the electronic device 1.

After transmitting the print job, the printing application 22 of the present embodiment stores a print log (S106). In the print log, information indicative of print target data, information indicative of a printer that is an apparatus caused to execute printing, and information indicative of date and time at which printing is executed are stored in association with each other. In the print log, information indicative of a print parameter may also be included. In addition, the information indicative of the print target data may include information indicative of a color of a coloring material that is used for printing of the print target data.

In addition, the CPU 11 determines whether an end instruction to end the printing application 22 by a user's operation is accepted (S107). In a case where the end instruction is not accepted (S107: NO), the CPU 11 returns to the display of the top screen or the like, for example, and further accepts a user's operation. In a case where it is determined that the end instruction by the user's operation is accepted (S107: YES), the CPU 11 ends the printing application 22.

Figure 3:
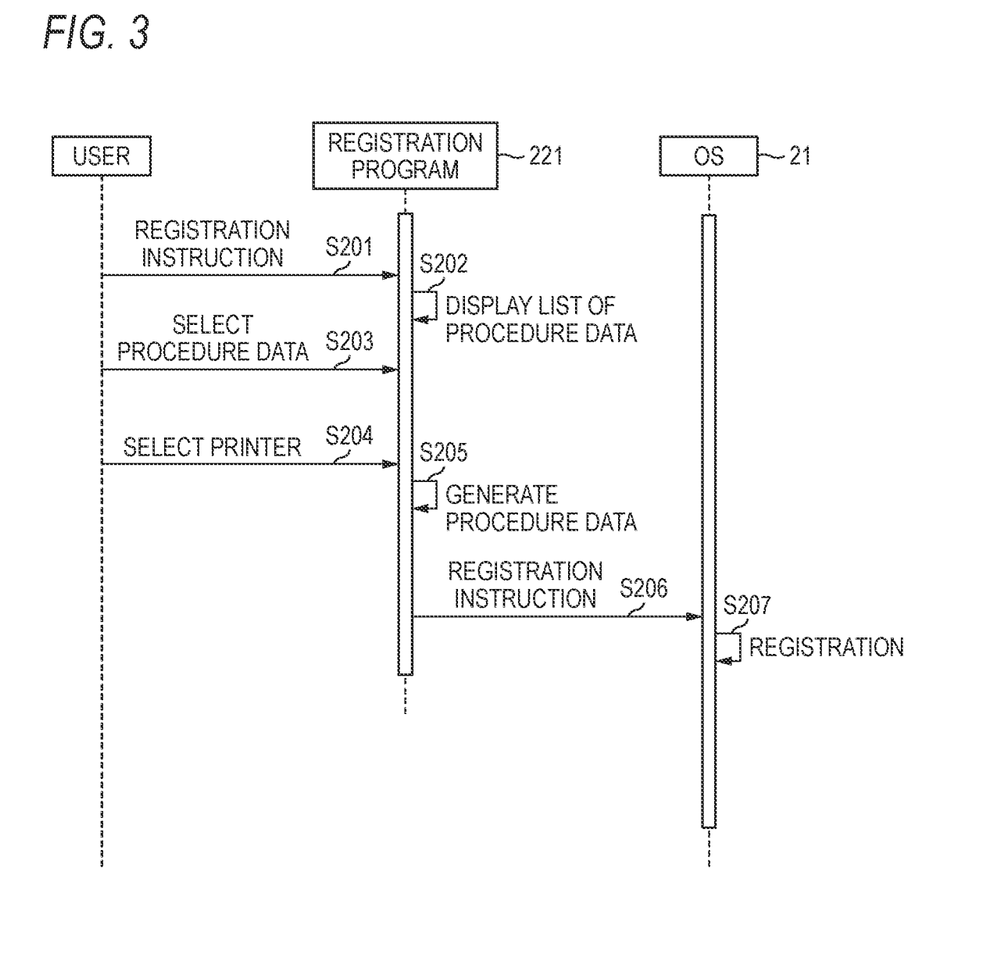
FIG. 3 is a sequence diagram showing a procedure of registering procedure data by a registration program.

Subsequently, processing of registering procedure data in the connection program 211 of the OS 21 by the registration program 221 is described with reference to a sequence diagram of FIG. 3. As described above, the registration program 221 is a program corresponding to the printing application 22, and is provided together with the printing application 22, for example. The registration program 221 may be included in the printing application 22. In addition, the registration program 221 may be a program different from the printing application 22, and may be, for example, a registration-only application or an installer of the printing application 22.

The registration program 221 is activated based on a registration execution instruction by the user (S201). Note that, the registration program 221 may be automatically activated as the printing application 22 is installed. When activated, the registration program 221 first displays a list of registrable procedure data (S202).

Figure 4:
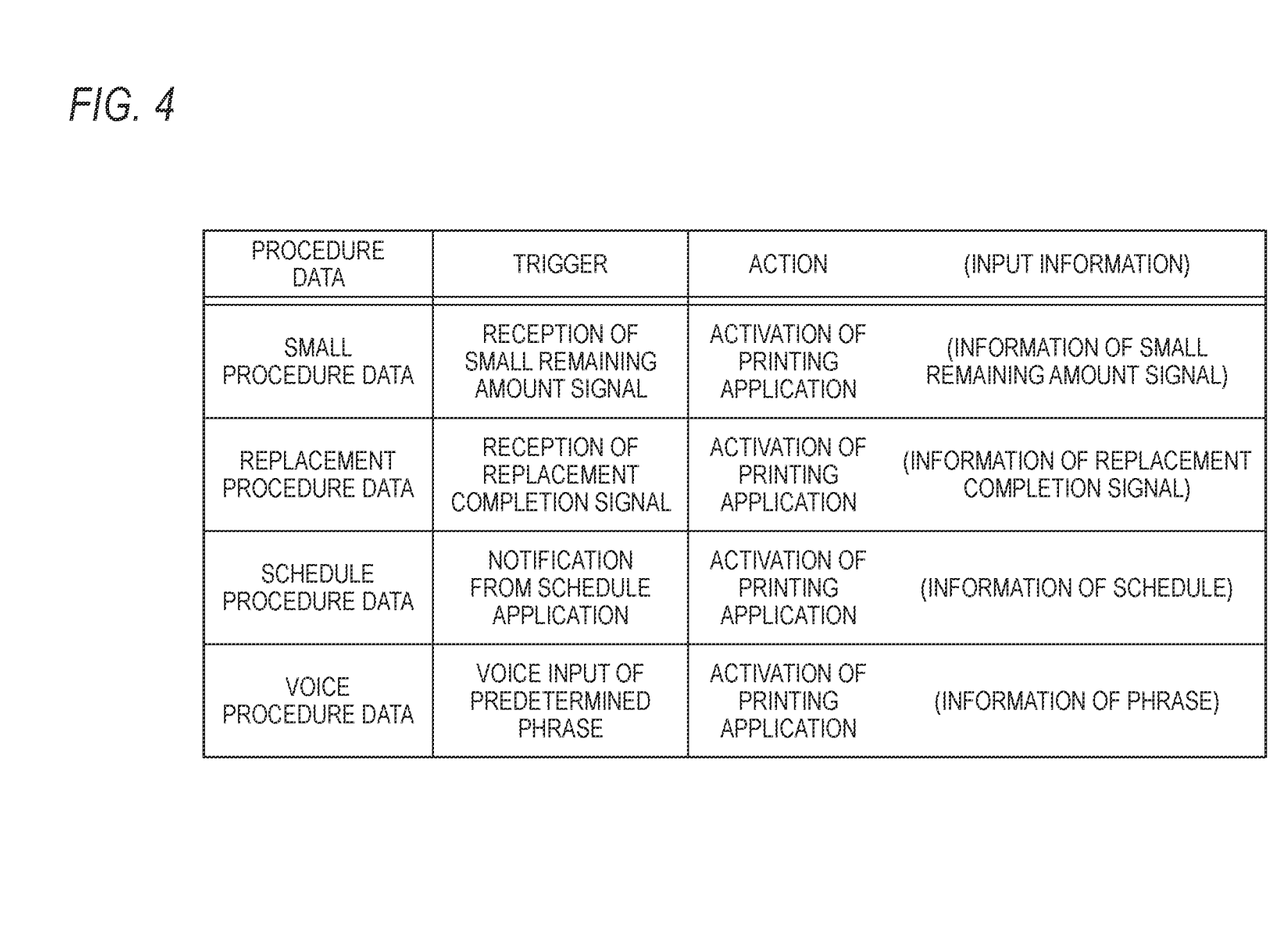
FIG. 4 shows an example of procedure data that can be registered by the registration program.

The registration program 221 of the present embodiment has, as the registrable procedure data, four types of procedure data, as shown in FIG. 4, for example. For example, the registration program 221 of the present embodiment has procedure data (hereinafter, referred to as 'small procedure data') whose trigger is reception of a small remaining amount signal from a printer, procedure data. (hereinafter, referred to as 'replacement procedure data' whose trigger is reception of a replacement completion signal from a printer, procedure data. (hereinafter, referred to as 'schedule procedure data') whose trigger is notification to a schedule application, and procedure data. (hereinafter, referred to as 'voice procedure data') whose trigger is a voice input of a predetermined phrase.

The respective procedure data provided in the registration program 221 has different triggers. The actions of the respective procedure data provided in the registration program 221 all include an activation procedure of the printing application 22, and input information that is information to be transmitted to the printing application 22 at the time of activation is respectively different. The respective procedure data provided in the registration program 221 is an example of the specific procedure data. The respective procedure data will be described in detail later.

The registration program 221 accepts selection of the procedure data of a registration target from the list displayed in S202, based on a user's operation (S203). In addition, the registration program 221 may accept selection of a printer that is a target of the trigger or action of the procedure data (S204). In a case where the small procedure data or the replacement procedure data is selected, for example, the registration program 221 may accept selection of a printer of a detection target from which a signal of a trigger is detected.

The registration program 221 generates procedure data, based on the user's selection (S205), and transmits the same to the OS 21 to instruct registration (S206). The OS 21 stores the procedure data received from the registration program 221 in the memory 12 and registers the same in the connection program 211, as the procedure data (S207). S203 and S204 are an example of the registration operation by the user, and S206 is an example of the registering of the selected specific procedure data in the operating system.

That is, in the present embodiment, since the predetermined procedure data including an activation procedure of the printing application 22 is prepared in advance as the registration program 221, the procedure data can be registered in the OS 21 based on a predetermined registration operation. Note that, in the electronic device 1, for example, a general purpose program for registration of the procedure data may be incorporated, and when the program is used, the various procedure data can be registered without using the registration program 221. However, in this case, the user needs to generate the procedure data by individually designating the trigger and the action. According to the registration program 221, the user does not have to perform a complicated operation for registering the predetermined procedure data, and can easily complete the registration of the predetermined procedure data.

If the procedure data is registered by the registration program 221, the printing application 22 is automatically activated by the connection program 211 at the time when the trigger of the registered procedure data is detected. In the action of each procedure data, a procedure of transmitting input information, which includes activation information that is information of the trigger of the procedure data, to the activated printing application 22 is included. When activated based on the procedure data by the function of the connection program 211, the printing application 22 receives the input information input from the connection program 211, and decides a processing procedure after activation, based on the received input information. For example, the decision procedure of deciding print target data is different for each activation information included in the input information.

Note that, in a case where the printing application 22 is manually activated based on a normal operation of the user without via the connection program 211, the printing application 22 of the present embodiment does not receive the input information. In a case Where the printing application 22 does not receive the input information at the time of activation, the printing application executes the above-described manual output processing. The printing application 22 of the present embodiment executes different operations in a case where the printing application 22 is manually activated based on the user's operation, that is, in a case where the printing application 22 does not receive the input information at the time of activation, and in a case where the printing application 22 is automatically activated by the connection program 211, that is, in a case where the printing application 22 receives the input information at the time of activation.

Subsequently, an example of operations of the printing application 22 in a case where the printing application 22 is activated by the connection program 211 based on the procedure data registered in the electronic device 1 is described. That is, each processing described below is executed based on the printing application 22 by the CPU 11 of the electronic device 1, when activated from the connection program 211. Note that, in the drawings, the processing by the OS 21 includes the processing by the connection program 211.

Figure 5A:
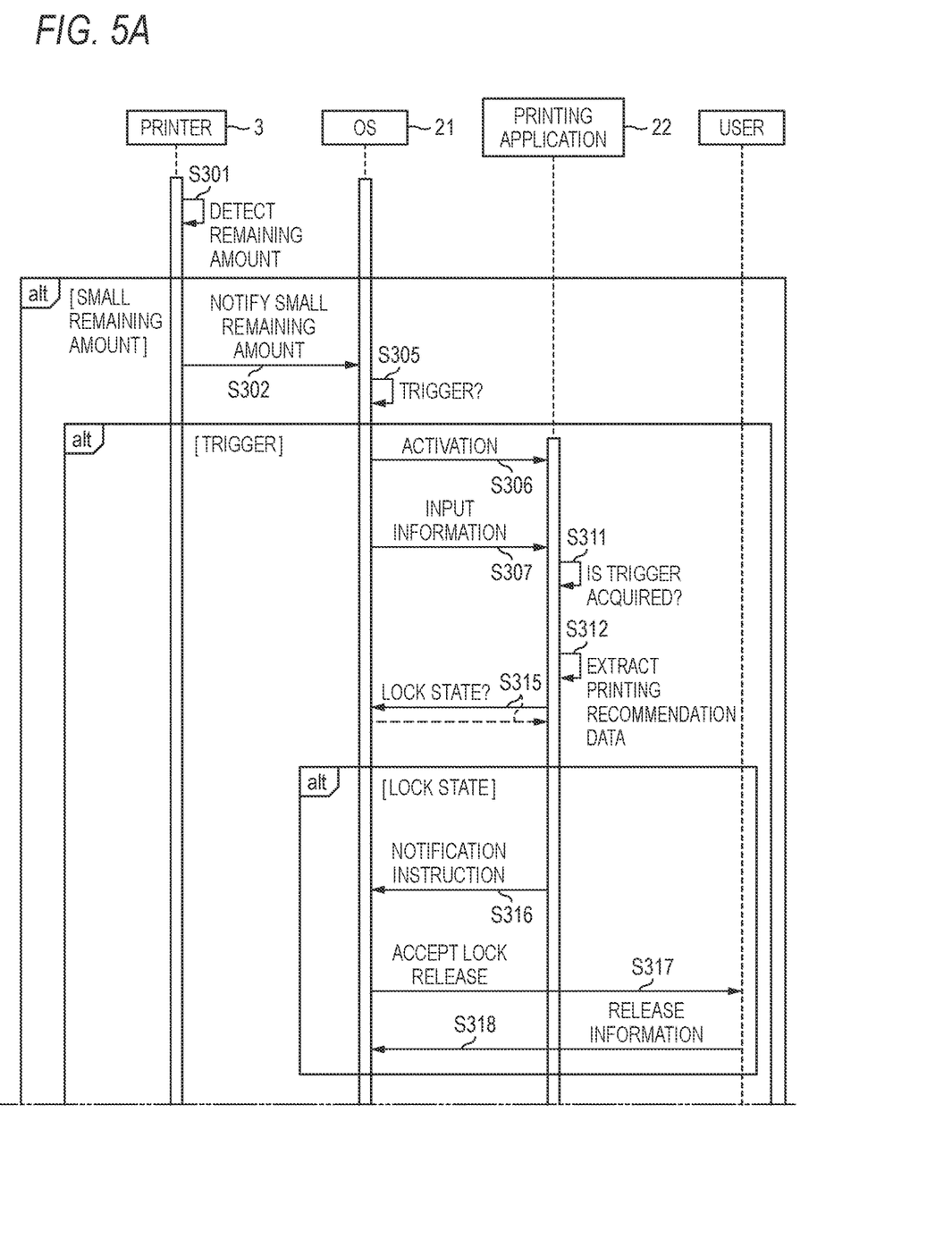
FIGS. 5A and 5B are a sequence diagram showing a procedure of processing that is executed by a printing application when activated as a result of reception of a small remaining amount signal.
Figure 5B:
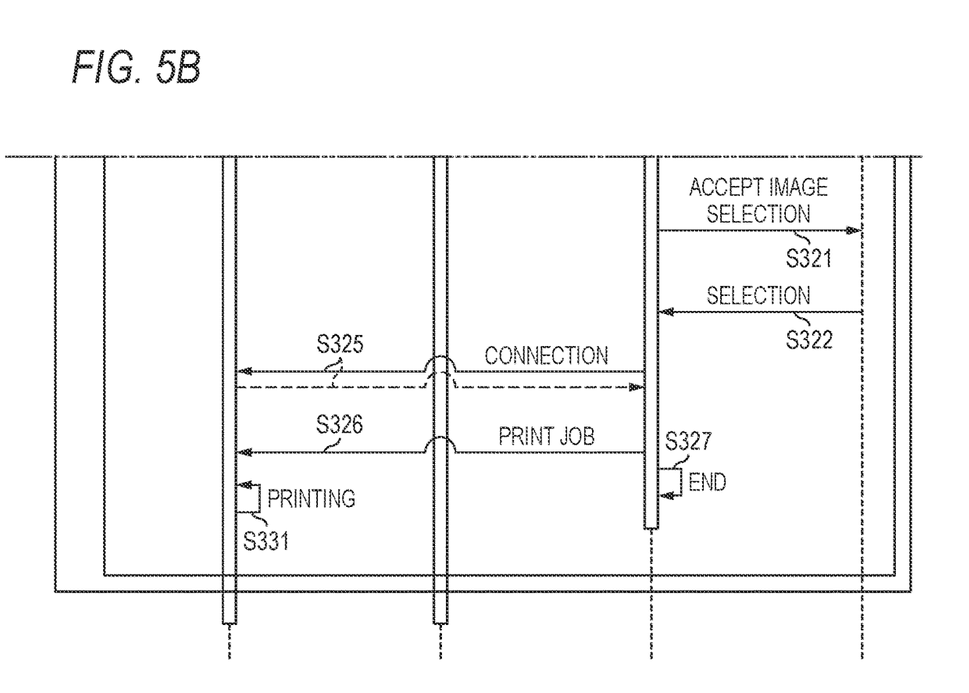

First, processing based on the small procedure data is described with reference to a sequence diagram of FIGS. 5A and 5B. In the electronic device 1 configured to perform operations of FIGS. 5A and 5B, the small procedure data whose trigger is reception of the small remaining amount signal from the printer 3 is registered in advance in the OS 21. Note that, in a case where the small procedure data is not registered, the electronic device 1 does not execute the operations shown in FIGS. 5A and 5B.

The printer 3 outputs the small remaining amount signal based on a user setting, for example. The printer 3 detects a remaining amount of the accommodated coloring material at a predetermined timing, for example (S301), and outputs the small remaining amount signal in a case where it is determined that the remaining amount is smaller than a predetermined amount (alt: small remaining amount) (S302).

The printer 3 performs broadcast or multicast to each apparatus in a connected network, for example. In a case where the printer 3 has accepted registration of a device as a notification destination to which status information is notified, the printer performs unicast to the registered device. In the present embodiment, the notification destination of the printer 3 includes the electronic device 1, and the electronic device 1 can receive the small remaining amount signal transmitted from the printer 3.

The connection program 211 of the OS 21 determines whether information, which is registered as a trigger in each procedure data registered in the OS 21 of the electronic device 1, is received based on the received signal (S305). In the electronic device 1 of the present embodiment, the small procedure data is registered. Therefore, in a case where the connection program 211 receives the small remaining amount signal, the connection program determines that the received signal corresponds to a trigger of the small procedure data (alt:[trigger]), and starts an action of the small procedure data. The small remaining amount signal is an example of the first signal, and the trigger of the small procedure data is an example of the first activation condition.

In the action of the small procedure data, an activation of the printing application 22 and an input of information, which indicates reception of the small remaining amount signal, to the printing application 22 are included. That is, the connection program 211 activates the printing application 22 based on the small procedure data. (S306), and transmits the input information including the information of the small remaining amount signal to the printing application 22 as the information at the time of activation (S307). In the small remaining amount signal, for example, printer information, which is information for identifying the printer 3 transmitting the small remaining amount signal, and color information, which indicates a color of the coloring material whose remaining amount becomes small, are included. After S306 and S307, the connection program 211 ends the action of the small procedure data.

Thereby, the printing application 22 is activated, and the printing application 22 receives the input information from the connection program 211. S307 is processing where the printing application 22 acquires the input information, and is an example of the acquiring of the input information. The printing application 22 acquires the information, which indicates a trigger of the activation, from the acquired input information (S311). Specifically, the printing application 22 acquires the information of the small remaining amount signal.

The printing application 22 extracts an image recommended as a print target based on a printing history, in response to acquiring the information of the small remaining amount signal as the input information (S312). For example, the printing application 22 extracts an image, which uses the coloring material of a color whose remaining amount becomes small, of images recently printed or images frequently printed by the printer 3 based on the stored punt log. Note that, the determination of the frequency corresponds to a fact that the number of printing times is equal to or larger than a predetermined number of times, a fact that printing was performed within a predetermined period retroactively from the present, and a combination thereof. The printing application 22 may simply extract an image printed in color, for example, in a case where a color whose remaining amount becomes small is a color other than black. Further, in a case where the color information is not included in the small remaining amount signal, only a recently printed image or a frequently printed image may be extracted.

After extracting the data, the printing application 22 inquires the OS 21 whether the electronic device 1 is in the lock state, and obtains a reply (S315). In a case of the lock state (alt[lock state]), the printing application 22 transmits, to the OS 21, an instruction to display a notification of the information of the small remaining amount on the user IF 13 (S316). S316 is an example of the notification in the lock state. This causes a notification screen, which notifies the small remaining amount, to be displayed on the user IF 13 via, the OS 21.

Figure 6:
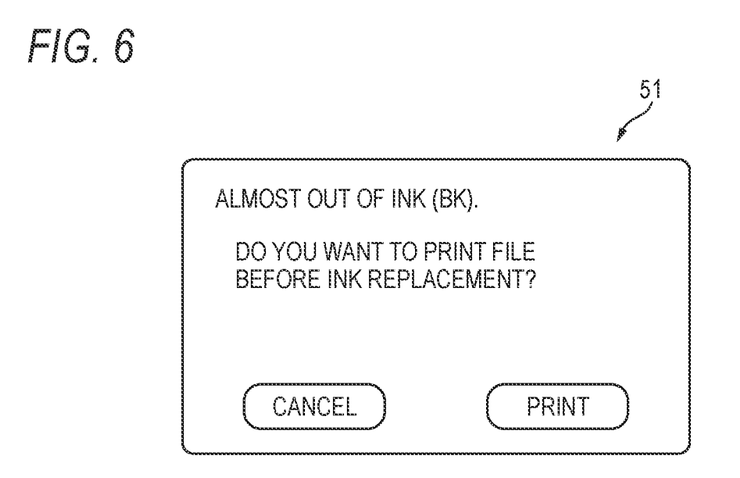
FIG. 6 shows an example of a notification screen of notifying a small remaining amount.

For example, as shown in FIG. 6, the printing application 22 displays a notification screen 51, which includes information of a color Whose remaining amount becomes small and buttons for accepting input as to whether or not to perform printing, and requests selection of a user. The processing of accepting selection on the notification screen 51 is an example of the accepting of selection of whether to perform the printing based on the input information.

When an instruction to execute printing is accepted on the notification screen 51 that is being displayed, the OS 21 displays a release screen for accepting an input of release information for releasing the lock state on the user IF 13 (S317). The user inputs release information for releasing the lock state on the release screen (S318). The OS 21 determines whether the input release information is appropriate release information, and in a case where it is determined that the input release information is not appropriate release information, the OS 21 again displays the release screen and maintains the lock state until an input of appropriate release information is accepted. On the other hand, in a case where it is determined that appropriate release information is input, the OS 21 releases the lock state and becomes the unlock state.

In a case where the unlock state is set as a result of the user's operation, the OS 21 transmits information indicative of the unlock state to the printing application 22. This causes the printing application 22 to proceed to a next operation. Note that, in a case where an instruction not to execute printing is accepted on the notification screen 51, the OS 21 transmits the information to the printing application 22. In a case where the printing application 22 receives the information of the instruction not to execute printing from the OS 21 or in a case where a predetermined time elapses without receiving the information indicating that the unlock state is set after the notification screen 51 is displayed, the printing application 22 ends the printing application.

In a case where a reply indicating that it is not the lock state is obtained in S315 or in a case where the information indicating the unlock state is received after S315, the printing application 22 displays an image selecting screen for accepting selection of an image of a print target on the user IF 13 (S321). S321 is an example of the notification in the unlock state.

Figure 7:
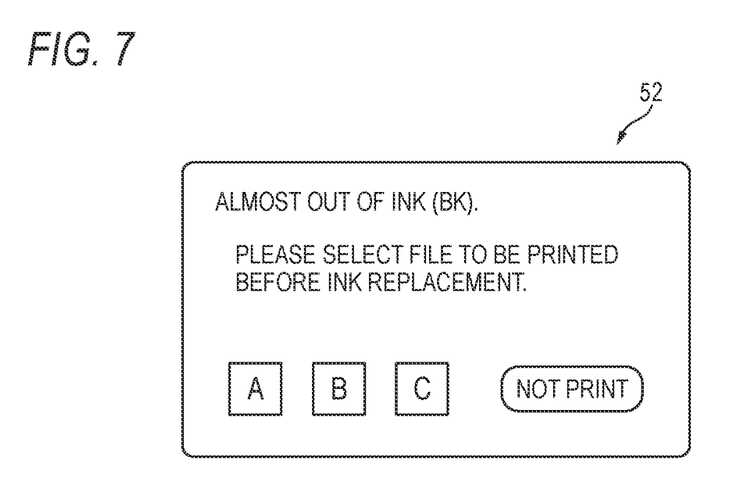
FIG. 7 shows an example of an image selecting screen.

For example, as shown in FIG. 7, the printing application 22 displays an image selecting screen 52, which includes information of an image of a selection target and a button for accepting an instruction not to perform printing, and requests selection. The printing application 22 displays, as the image of a selection target, the list of images extracted in S312, for example, and accepts a user's selection. In the image selecting screen 52, the printing application 22 may display an image of a selection target by a thumbnail image indicating a print image, or by a list of file names.

Since information that can be input is different from each other in the lock state and the unlock state, notification contents are different from each other in the lock state and the unlock state, so that notifications can be performed according to the respective states. Specifically, in the unlock state, information indicative of print target data is displayed, and in the lock state, information indicative of print target data is not displayed. Note that, in the lock state, an amount of data that can be displayed on the screen may be restricted, and an amount of messages may be set smaller than that in the unlock state. In addition, in the lock state, a size of display may be set smaller than that in the unlock state.

The printing application 22 accepts a selection instruction of an image of a print target made by the user on the image selecting screen 52 (S332), and decides the selected data as print target data, S322 is an example of the deciding of the print target data.

Note that, in a case where an instruction not to execute printing is accepted on the image selecting screen 52, the printing application 22 ends the printing application. By accepting selection of whether to execute printing on the image selecting screen 52, it is possible to avoid unintended printing. In addition, in a case where an instruction input is not accepted after a predetermined time has elapsed since the image selecting screen 52 is displayed, the printing application 22 may also end the printing application. Further, in a case where an appropriate image is not extracted in S312, the printing application 22 may also end the printing application.

In a case where selection of an image of a print target is accepted, the printing application 22 tries to connect to the printer 3, which is a printer indicated by the printer information, from the input information received from the connection program 211 at the time of activation (S325). Specifically, the printing application 22 establishes connection with the printer 3 by transmitting a search signal for searching for the printer 3 and receiving a response signal from the printer 3. In a case where the connection cannot be established, the printing application 22 may notify that the connection cannot be established.

In a case where the connection with the printer 3 is established, the printing application 22 outputs, to the printer 3, a print job for causing the printer to perform printing of the image selected in S322 (S326). S326 is an example of the automatic outputting of the print job. In addition, the printing application 22 ends the printing application (S327). The printer 3 executes printing based on the print job transmitted in S326 (S331), thereby generating a printed material.

If the small procedure data is registered in the electronic device 1 of the present embodiment, the printing application 22 is activated by reception of the small remaining amount signal, as a trigger. In the processing according to the small procedure data, in a case where the remaining amount in the coloring material of the printer becomes small, data that has been printed frequently, for example, is automatically extracted and the selection instruction and printing instruction of the data are accepted, so that a user's labor for printing is reduced. In addition, it is possible to reduce a possibility of a situation where it is difficult to obtain an urgent printed material due to lack of the coloring material in the printer without noticing it.

Figure 8A:
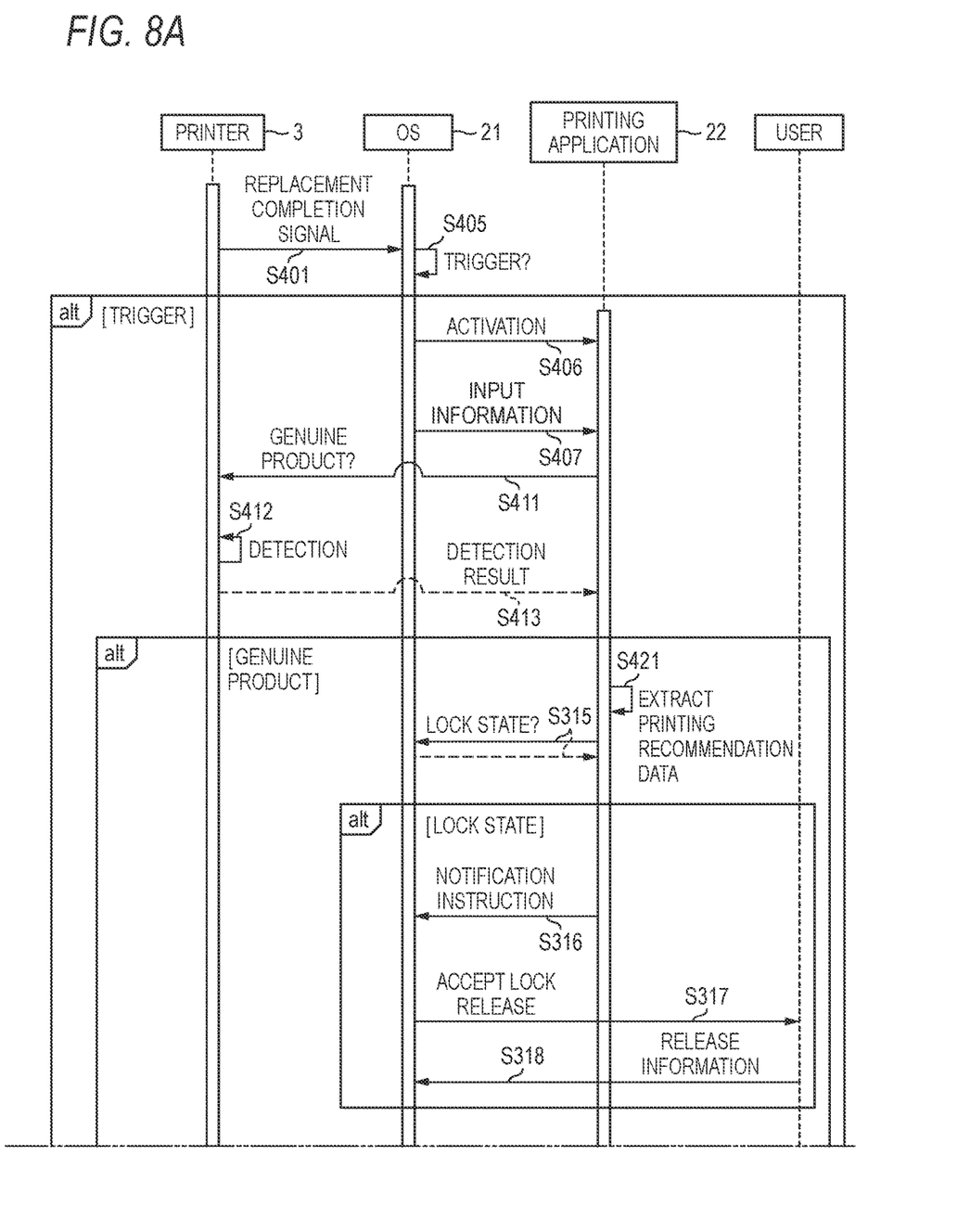
FIGS. 8A and 8B are a sequence diagram showing a procedure of processing that is executed by the printing application when activated as a result of reception of a replacement completion signal.
Figure 8B:
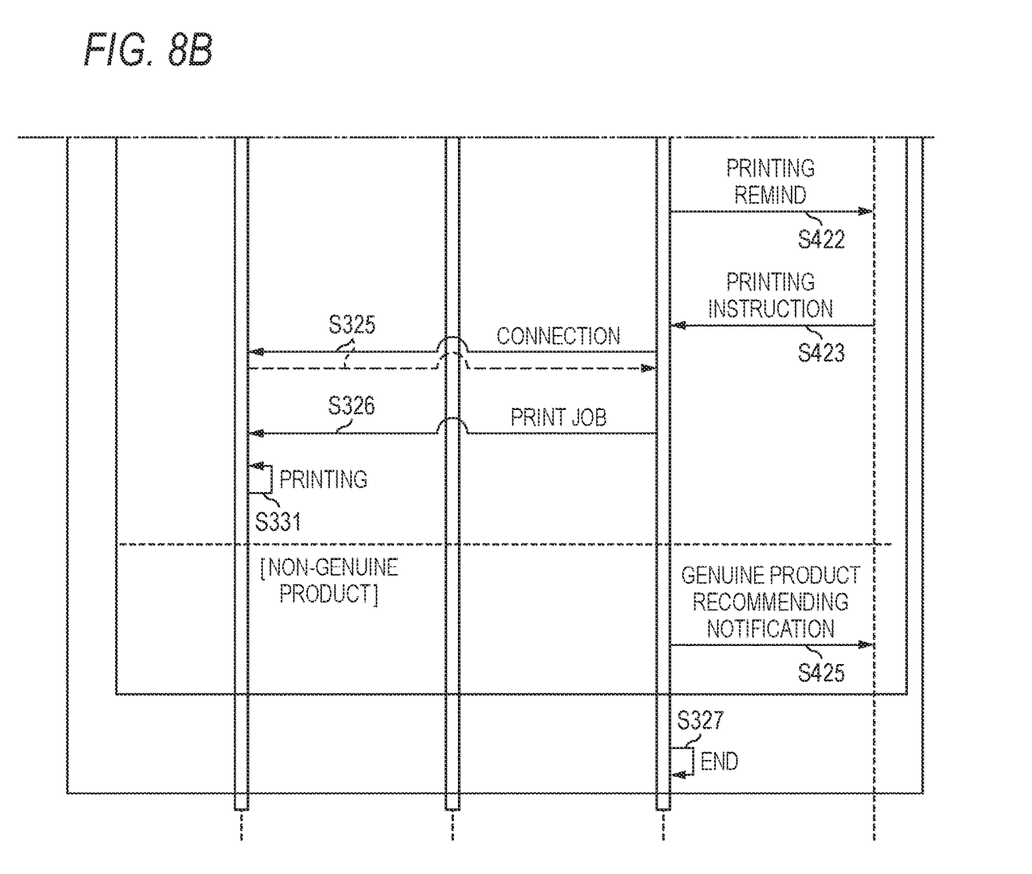

Next, processing based on the replacement procedure data is described with reference to a sequence diagram of FIGS. 8A and 8B. In the electronic device 1 configured to perform operations of FIGS. 8A and 8B, the replacement procedure data whose trigger is reception of the replacement completion signal from the printer 3 is registered in advance in the OS 21. Note that, in a case where the replacement procedure data is not registered, the electronic device 1 does not execute the operations shown in FIGS. 8A and 8B. In the below, the similar procedures to the procedures of the small procedure data are denoted with the same reference signs, and the descriptions thereof are simplified.

As described above, in a case where it is detected that the cartridge of the coloring material has been replaced, the printer 3 transmits a replacement completion signal (S401). Similar to the case of the small remaining amount signal, the electronic device 1 receives the replacement completion signal from the printer 3.

The connection program 211 of the OS 21 determines whether information, which is registered as a trigger in each procedure data registered in the OS 21 of the electronic device 1, is received, based on the received signal (S405). In the electronic device 1 of the present embodiment, the replacement procedure data is registered. Therefore, in a case where the connection program 211 receives the replacement completion signal, the connection program determines that the received signal corresponds to a trigger of the replacement procedure data. (alt:[trigger]), and starts an action of the replacement procedure data. The replacement completion signal is an example of the second signal, and the trigger of the replacement procedure data is an example of the second activation condition.

In the action of the replacement procedure data, an activation of the printing application 22 and an input of information, which indicates reception of the replacement completion signal, to the printing application 22 are included. That is, the connection program 211 activates the printing application 22 based on the replacement procedure data (S406), and transmits the input information including the information of the replacement completion signal to the printing application 22 as the information at the time of activation (S407). In the information of the replacement completion signal, for example, printer information, which is information for identifying the printer 3 transmitting the replacement completion signal, and color information, which indicates a color of the replaced coloring material, are included. After S406 and S407, the connection program 211 ends the action of the replacement procedure data.

Thereby, the printing application 22 is activated, and the printing application 22 receives the input information from the connection program 211. S407 is processing where the printing application 22 acquires the input information, and is an example of the acquiring of the input information. The printing application 22 acquires the information, which indicates a trigger of the activation, from the acquired input information (S311). Specifically, the printing application 22 acquires the information of the replacement completion signal.

In response to acquiring the information of the replacement completion signal as the input information, the printing application 22 inquires the printer 3, which is a printer transmitting the replacement completion signal, whether the replaced cartridge is a manufacturer genuine product (S411). The printer 3 detects whether the replaced cartridge is a genuine product based on the instruction of the printing application 22 (S412), and transmits a detection result to the printing application 22 (S413).

In a case where a result, which indicates that the replaced cartridge is a genuine product, is obtained (alt:[genuine product]), the printing application 22 extracts data of recommending printing (S421). The printing application 22 extracts, as recommendation data, an image that uses a color indicated in the color information a lot and an image selected as a print target immediately before replacement, for example. The printing application 22 may, for example, extract the recommendation data based on the print log, or request the OS 21 or the like for analysis and extract the recommendation data based on the result.

After extracting the data, the printing application 22 inquires the OS 21 whether the electronic device 1 is in the lock state, and obtains a reply (S315). In a case of the lock state (aft [lock state]), the printing application 22 transmits, to the OS 21, an instruction to display a notification of the information of replacement completion on the user IF 13 (S316). This causes a notification screen, which notifies the replacement completion, to be displayed on the user IF 13 via the OS 21.

In a case where an instruction to execute printing is accepted on the notification screen that is being displayed, the OS 21 accepts an input of release information for releasing the lock state (S317 to S318), similar to the case of the small procedure data. In a case where the instruction not to execute printing is accepted or in a case where the lock state is not released, the printing application 22 ends the printing application.

In a case where a reply indicating that it is not the lock state is obtained in S315 or in a case where the information indicating the unlock state is received after S315, the printing application 22 displays a printing remind screen for recommending printing of the data extracted in S421 on the user IF 13 (S422). S422 is an example of the notification in the unlock state.

In a case where a printing instruction by the user is accepted on the printing remind screen (S423), the printing application 22 decides the displayed data, as the print target data. In a case where there is a plurality of extracted data, the printing application 22 may accept selection of data on the printing remind screen. The processing of deciding, as the print target data, the data selected on the printing remind screen displayed in S422 based on the instruction in S423, is an example of the deciding of the print target data.

After accepting the printing instruction, the printing application 22 generates a print job, checks connection with the printer 3 (S325), and outputs the print job to the printer 3 (S326). The printer 3 executes printing based on the received print data (S331).

On the other hand, in a case where a reply, which indicates that the replaced cartridge is not a genuine product (alt: non-genuine product), is obtained in response to the inquiry in S411 as to whether the replaced cartridge is a genuine product, the printing application 22 displays a notification, which recommends a genuine product, on the user IF 13 (S425). In a case where a non-genuine product is mounted, the printing application 22 of the present embodiment does not recommend printing. After S326 or S425, the printing application 22 ends the printing application (S327).

If the replacement procedure data is registered in the electronic device 1 of the present embodiment, the printing application 22 is activated by reception of the replacement completion signal, as a trigger. In a state where the amount of the coloring material in the cartridge is small, a printed material of low quality may be obtained. In the processing according to the replacement procedure data, in a case where the cartridge accommodating a coloring material is replaced, data that uses a color of the replaced cartridge for printing is automatically extracted and recommended as the print target data. As a result, a user's labor for printing is reduced. This increases a possibility that a printed material of high quality can be obtained by using a coloring material after replacement.

Next, processing based on the schedule procedure data is described. Occurrence of a notification from an application can be registered as the trigger of the procedure data. For example, the electronic device 1 in which a schedule application is incorporated can register, as the trigger of the procedure data, a notification from the schedule application. The electronic device 1 where the schedule procedure data is registered in the OS 21 activates the printing application 22 based on the notification from the schedule application.

The schedule application may, for example, accept in advance an input of a scheduled date, a designation of a notification and the like made by the user, and output the notification information to the OS 21 based on the accepted instruction. For example, in a case where the schedule application has accepted an input of a scheduled date of participation in an event and a notification designation of the morning of that day, the schedule application outputs the notification information to the OS 21 in the morning of the designated scheduled date by using a clock function embedded in the electronic device 1.

In the trigger of the schedule procedure data of the present embodiment, for example, both of: a notification from the schedule application; and an arrival of the predetermined time or an entry into a predetermined position range being satisfied is registered. The entry into a predetermined position range means, for example, entry into a predetermined range from a registered home position, i.e., returning home. In the present embodiment, the connection program 211 of the electronic device 1 where the schedule procedure data of the present embodiment is registered determines that a trigger is detected on the night of the day or after returning home, after accepting the notification of the scheduled date of participation in an event from the schedule application.

In the action of the schedule procedure data of the present embodiment, for example, activation of the printing application 22 and a procedure of transmitting the notified schedule information to the printing application 22 as the input information are registered. In a case where it is determined that the trigger of the schedule procedure data is satisfied, the connection program 211 activates the printing application 22, and transmits, to the activated printing application 22, the input information including the schedule information, for example, a date of the schedule, a content of the schedule and whether there is a photo that matches with the schedule information.

For example, the connection program 211 starts a procedure of the schedule procedure data on the night of the scheduled date of participation in an event, and transmits information of the event and information of a photo captured during the event to the printing application 22. When the printing application 22 receives the information of the event and the information of the photo as the input information at the time of activation, the printing application displays the information on the user IF 13 and accepts a user instruction as to whether to perform printing. When the printing application 22 accepts a printing instruction, the printing application checks connection with the printer 3 and transmits the print data to the printer 3.

When the schedule procedure data is registered in the electronic device 1 of the present embodiment, the printing application 22 is activated based on the notification from the schedule application. In the processing according to the schedule procedure data, after the schedule input to the schedule, data corresponding to the schedule, such as a photo captured during a period of the schedule, is automatically extracted, and the selection instruction and printing instruction of the data are accepted, so that a user's labor for printing is reduced.

Next, processing based on voice procedure data is described. The OS 21 of the electronic device 1 has functions of analyzing voice input to the microphone by processing on an external server or the like on the Internet and acquiring information of the phrase indicated by the voice. The electronic device 1 where the voice procedure data is registered in the OS 21 activates the printing application 22, based on a predetermined phrase input by voice.

In the trigger of the voice procedure data of the present embodiment, for example, a voice input of a predetermined phrase is registered. The connection program 211 of the electronic device 1 where the voice procedure data of the present embodiment is registered analyzes the input voice, and determines that a trigger is detected in a case where it is determined that an analysis result corresponds to the registered predetermined phrase. The predetermined phrase includes, for example, an instruction to generate a label, and an instruction of a print content to be printed on the label.

In the action of the voice procedure data of the present embodiment, for example, activation of the printing application 22 and a procedure of transmitting information of the input phrase to the printing application 22 are registered. When it is determined that the trigger of the voice procedure data is satisfied, the connection program 211 activates the printing application 22, and transmits, to the activated printing application 22, the input information including, for example, an instruction to print a label and a print content, based on the information of the phrase input by voice.

Note that, the printer 3 can, for example, supply a label sheet, and may have a function of performing printing on the label sheet. In addition, the electronic device 1 of the present embodiment may be connected to a so-called label printer, separately from the printer 3. The label printer is a printer configured to accommodate a label sheet wound in a roll shape and having a label generating function of performing printing by a thermal transfer type print head while unwinding the label sheet. The label printer may also have a cutter function of cutting a printed part of the label sheet, and may also have, for example, a function of performing printing and cutting and discharging the printed label by accepting a printing instruction to which an automatic cut setting is added.

When the printing application 22 receives information including a label venerating instruction at the time of activation, the printing application decides print target data based on the input information, generates a print job based on the decided print target data, and transmits the same to a printer having a label generating function. After activation, the printing application 22 may further accept a voice input via the OS 21.

In addition, the printing application 22 may generate the print target data by appropriately converting the information input by voice. For example, the priming application 22 may convert a voice input of 'current time' into information indicative of time, such as XX:YY. Further, the printing application 22 may decide, as the print target data, a last day of a period which is obtained in response to an input of 'retention period Z days' by adding Z days to the date of today, for example. Further, when the printing application 22 receives information indicative of a pictogram or a mark, the printing application may decide the corresponding pictogram or mark as the print target data. Further, when the printing application 22 receives information indicative of predetermined voice such as 'cut', the printing application may add an automatic cut setting to the print job.

If the voice procedure data is registered in the electronic device 1 of the present embodiment, the printing application 22 is activated based on the voice input by the user. In the processing according to the voice procedure data, a label is automatically generated based on a voice instruction. Therefore, it is possible to obtain a desired label without touching the electronic device 1 or the printer 3.

As described in detail above, when the printing application 22 disclosed in the present specification is activated by the connection program 211 based on the registered procedure data, the printing application receives the input information from the connection program 211 and executes the processing corresponding to the content of the information included in the received input information, thereby deciding a print target data and automatically outputting a print job based on the decided print target. As a result, when the trigger included in the registered procedure data is accepted, the print target data is automatically decided and printed, so that it is possible to reduce a user's labor upon printing, as compared to a case where an operation for deciding print target data and an operation for instructing printing are performed after activation.

The present embodiment is merely an example and does not limit the present invention. Therefore, the present invention can be diversely improved and modified without departing from the spirit thereof. For example, the electronic device 1 is not limited to the portable device, and may be a stationary personal computer or the like. In addition, the printer that is connected to the electronic device 1 is not limited to a printer having only a printing function, and may be another apparatus having a printing function, such as a complex machine, a copier, and a FAX apparatus. Further, the printer that is connected to the electronic device 1 is not limited to one printer and may be two or more printers. Further, the printer may be connected to the electronic device 1 at the time of outputting a print job, and may not be connected all the time.

Further, in the present embodiment, the plurality of procedure data can be registered. However, only one procedure data may be registered. In addition, for example, the registration program 221 may not have all the above-described four types of the procedure data. In addition, for example, the registration program 221 may not accept the user's selection on the procedure data of a registration target. That is, the registration program 221 may be a program configured to register all the provided procedure data when execution thereof is started.

Further, for example, in the present embodiment, the printer information and the color input information are included in the input information of the small procedure data or the replacement procedure data but may not be included. For example, a designation of a printer of a detection target of a signal may be included as the trigger of the small procedure data or the replacement procedure data, and the action of the procedure data may be started in a case where a signal from the designated printer is detected. In addition, for example, the information of the printer configured to transmit a print job in the schedule procedure data or the voice procedure data may be included in the action of the procedure data or may be provided in advance to the printing application 22.

In addition, for example, in the action of each procedure data of the present embodiment, the data for which printing is recommended is extracted and displayed and the user is inquired whether to print the data. However, the present invention is not limited thereto. For example, the printing application 22 may be configured to decide data for which printing is recommended, as the print target data, to generate a print job and to automatically output the same. In this case, the printing application 22 may be configured to notify that the print job has been output, after outputting the print job.

Further, for example, the data that becomes a target of extraction as data for which printing is recommended in each procedure data may be only data printed in the past based on the printing history or may be all data that is managed by the OS 21. In addition, the timing of extracting the data for which printing is recommended is not limited to the timing exemplified in the present embodiment and may be any timing before the inquiry to the user or the generation of a print job. For example, the extraction of the data may be performed by another program such as the OS 21, before activation of the printing application 22. For example, as the action of the procedure data, a procedure for causing a photo application or the like to extract data may be included, and the printing application 22 may receive information of the extracted data as the input information at the time of activation.

Further, in a case where the replaced cartridge is not a genuine product, the procedure of deciding the print target data or generating a print job is not included in the replacement procedure data of the present embodiment, but may be included. That is, even in a case where the replaced cartridge is not a genuine product, the printing application 22 may automatically perform printing. In this case, the inquiry as to whether the replaced cartridge is a genuine product may not be included in the action of the procedure data.

Further, in the present embodiment, in a case where the printing application 22 is activated based on the procedure data, when the processing is over, the printing application 22 ends the printing application, but may not end the printing application.

Further, in any flowchart disclosed in the embodiment, the plurality of processing in the plurality of arbitrary steps can be arbitrarily changed in terms of execution order or may be executed in parallel as long as the processing contents do not conflict with each other.

Further, the processing disclosed in the embodiment may be executed by hardware such as a single CPU, a plurality of CPUs and an ASCI or by a combination thereof. In addition, the processing disclosed in the embodiment can be implemented in various aspects such as a storage medium in which a program for executing the processing is stored, a method, and the like.

What is claimed is:

1. A non-transitory computer readable storage medium storing an application program executable by a computer of an information processing device, an operating system of the information processing device having an automatic function, and the automatic function being a function that, in a case where procedure data indicating: (i) a series of procedures of a plurality of functions and operations; and (ii) an activation condition for activating the series of procedures, is registered in the operating system, the operating system automatically executes the series of procedures in response to the activation condition being satisfied,
   wherein the application program is configured to be activated based on a user's operation using a user interface of the information processing device and to be activated based on the automatic function of the operating system,
   wherein, in a case where the application program is activated based on the user's operation using the user interface of the information processing device, the application program causes the computer to:
   accept selection of print target data by using the user interface and output a print job based on the selected print target data,
   wherein, in a case where the application program is activated based on the automatic function of the operating system, the application program causes the computer to:
   acquire input information which is input from the operating system at the time of activation and includes activation information for identifying the activation condition;
   decide print target data based on the acquired activation information; and
   automatically output a print job based on the decided print target data, and
   wherein the operating system is configured to transmit the input information to the application program at the time of activating the application program based on the automatic function.

2. The non-transitory computer readable storage medium according to claim 1,
   wherein a plurality of the procedure data can be registered in the operating system, the activation information indicating the activation condition being different for each of the plurality of the procedure data, and
   wherein in the deciding of the print target data, a decision procedure for deciding the print target data is different for each activation information, and the print target data is decided by a decision procedure corresponding to the acquired activation information.

3. The non-transitory computer readable storage medium according to claim 1,
   wherein in the acquiring of the input information, the input information including the activation information and printer information for identifying a printer is acquired, the operating system having a function of detecting a signal that is output from a printer, the operating system being capable of setting, in the automatic function, detection of the signal that is output from the primer as the activation condition, and when the operating system activates the application program by detecting the signal that is output from the printer, the operating system further transmitting, to the application program, the input information including the activation information and the printer information indicative of the printer that output the signal, and
   wherein in the automatic outputting of the print job, the print job for causing the printer, which is indicated by the acquired printer information, to perform printing based on the decided print target data is output to the printer.

4. The non-transitory computer readable storage medium according to claim 3,
   wherein in the deciding of the print target data, in a case where the activation information indicates a first activation condition Which is detection of a first signal that is output from a printer, data that has been frequently printed by the printer indicated in the acquired printer information is decided as the a print target data based on a printing history, the first signal being output from the printer when a remaining amount of a coloring material becomes smaller than a predetermined amount.

5. The non-transitory computer readable storage medium according to claim 3,
   wherein in the acquiring of the input information, the input information including the printer information and color information is acquired, and
   wherein in the deciding of the print target data, in a case where the activation information indicates a second activation condition which is detection of a second signal that is output from a printer, the print target data is decided from data that uses, for printing, a color indicated in the acquired color information, the second signal being a signal that is output from the printer in a case where a cartridge accommodating a coloring material is replaced, and when the operating system activates the application program by detecting the second signal that is output from the printer, the operating system including the color information, which indicates a color of the coloring material of the replaced cartridge, in the input information that is transmitted to the application program.

6. The non-transitory computer readable storage medium according to claim 1,
wherein, in the case where the application program is activated based on the automatic function of the operating system, the application program further causes the computer to:
cause the user interface of the information processing device to perform notification based on the input information, a display mode of the user interface of the information processing device including a lock state where some inputs by the user interface are limited and an unlock state which is not the lock state, and a notification content of the notification in the lock state being different from a notification content of the notification in the unlock state.

7. The non-transitory computer readable storage medium according to claim 6,
wherein, in the case where the application program is activated based on the automatic function of the operating system, the application program further causes the computer to:
cause the user interface of the information processing device to perform the notification after the acquiring of the input information and before the automatic outputting of the print job,
wherein in the causing of the user interface of the information processing device to perform the notification, notification of requesting selection of whether to perform printing based on the input information is performed as the notification, and
wherein the application program further causes the computer to:
accept selection of whether to perform the printing based on the input information after the causing of the user interface of the information processing device to perform the notification, the automatic outputting of the print job being executed on condition that the selection of performing the printing based on the input information is accepted.

8. The non-transitory computer readable storage medium according to claim 1,
wherein the application program has, as the procedure data, at least one specific procedure data which includes the activation of the application program in the series of procedures, and
wherein the application program further causes the computer to:
in a case where a registration operation is accepted via the user interface of the information processing device in a state where at least one of the specific procedure data is selected, register the selected specific procedure data in the operating system.

9. A printing system comprising:
a printer; and
an application program incorporated in an information processing device,
wherein the application program is configured to be activated based on a user's operation using a user interface of the information processing device and to be activated based on an automatic function of an operating system of the information processing device, the automatic function being a function that, in a case where procedure data indicating: (i) a series of procedures of a plurality of functions and operations; and (ii) an activation condition for activating the series of procedures, is registered in the operating system, the operating system automatically executes the series of procedures in response to the activation condition being satisfied,
wherein, in a case where the application program is activated based on the user's operation using the user interface of the information processing device, the application program causes a computer of the information processing device to:
accept selection of print target data by using the user interface and output a print job based on the selected print target data,
wherein, in a case where the application program is activated based on the automatic function of the operating system, the application program further cause the computer of the information processing device to:
acquire input information which is input from the operating system at the time of activation and includes activation information for identifying the activation condition;
decide print target data based on the acquired activation information; and
automatically output, to the printer, a print job for causing the printer to perform printing based on the decided print target data, and
wherein the operating system is configured to transmit the input information to the application program at the time of activating the application program based on the automatic function.

10. The printing system according to claim 9, further comprising:
a registration program incorporated in the information processing device,
wherein the registration program has, as the procedure data, at least one specific procedure data which includes the activation of the application program in the series of procedures, and
wherein the registration program further causes the computer of the information processing device to:
in a case where a registration operation is accepted via the user interface of the information processing device in a state where at least one of the specific procedure data is selected, register the selected specific procedure data in the operating system.

* * * * *